Patented Mar. 4, 1941

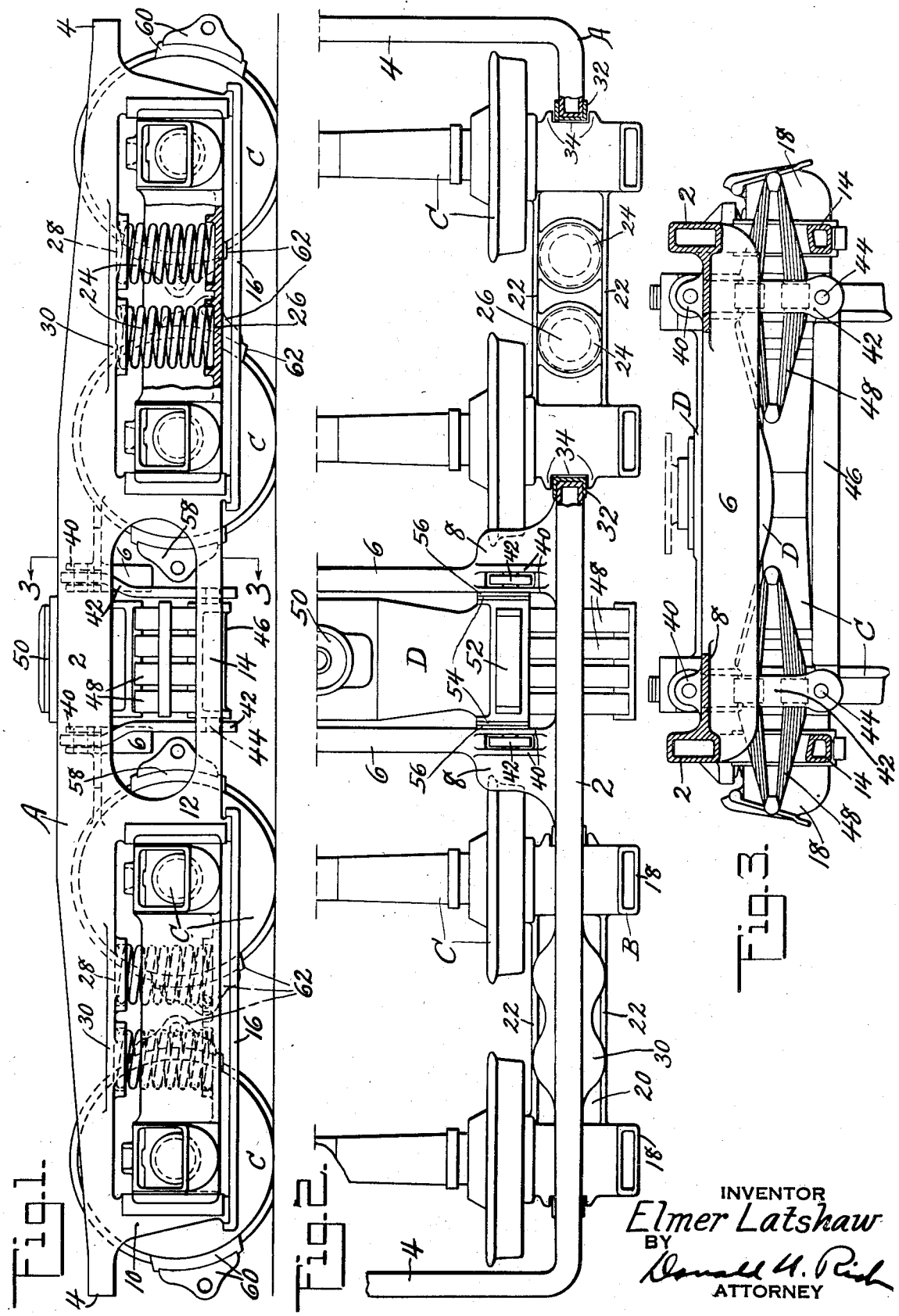

2,233,541

UNITED STATES PATENT OFFICE 2,233,541

EIGHT-WHEEL TRUCK

Elmer Latshaw, Philadelphia, Pa., assignor to The J. G. Brill Company, Philadelphia, Pa., a corporation of Pennsylvania Application March 8, 1938, Serial No. 194,575

17 Claims. (Cl. 105—183)

This invention relates to railway trucks in general and in particular to large capacity trucks of the eight-wheel type.

In the past freight car trucks have been built in which a massive H-formed bolster was used resting at its ends upon the springs of conventional four-wheel trucks. Eight-wheel passenger car trucks have likewise been built of a somewhat similar design but with the large H casting resting upon the bolsters of the conventional four-wheel traucks, thus giving a more flexible truck than was obtained for freight service. In all of these trucks the overall length of the truck was excessive and the truck was exceptionally heavy due to the metal used in the numerous bolsters and cross bearing members. It is an object, therefore, of this invention to provide an eight-wheel truck of simple design in which only a single bolster of conventional design and support is used.

A further object of the invention is the provision of a compact eight-wheel truck in which the side frames are formed with widely spaced pedestal jaws to accommodate double journal boxes.

A still further object of the invention is the provision of a compact eight-wheel truck using twin journal boxes which of themselves serve as equalizers to distribute the load to the axles carried thereby.

A still further object of the invention is the provision of a compact eight-wheel truck having clasp brakes with the adjacent shoes vertically staggered in order that the overall dimensions of the truck will be substantially equal to those of the conventional six-wheel truck.

These and other objects of the invention will be apparent to persons skilled in the art from a study of the following description and accompanying drawing, in which Figure 1 is a side elevational view of the approved truck with a portion thereof broken away to more clearly disclose the structure;

Fig. 2 is a plan view of substantially one-half the truck shown in Figure 1, and Fig. 3 is a sectional view taken substantially on line 3—3 of Figure 1 and showing the bolster mounting and side frame construction.

Referring now to the drawing in detail, it will be seen that the truck is composed of a frame unit A which is carried at its ends by twin journal boxes B mounted on wheel and axle assemblies C and has the conventional type of bolster D resiliently and swingably suspended from the frame unit. The truck frame in the present instance is shown as cast in one piece with heavy side pieces 2 joined together by end ties 4 and intermediate transoms 6, the latter being flared as at 8 in order to stiffen the transom and frame and to assist in transmitting the heavy strains from the transoms to the side frames. Each side piece 2 is preferably cast with upper substantially box section members from which depend outer pedestal jaws 10 and inner pedestal jaws 12, the latter being connected by rigid box section tie 14, while the inner and outer pedestal jaws at either end of the frame will be joined together in the customary manner by bottom tie 16 bolted or otherwise secured in place.

The twin journal box unit B is preferably cast or otherwise integrally formed with conventional designed journal boxes 18 joined together by an upwardly opening channel-shaped tie 20 having the sides 22 spaced apart sufficiently to receive therebetween springs 24, the lower ends of which rest within seats 26 formed on the web of the upwardly opening channel, while the upper ends bear against spring seats 28 formed by flared portions 30 of the truck side units. Each of the pedestal jaws is provided with the usual wear pad 32 adapted to engage guide portions 34 formed on the ends of the twin journal box unit, there being sufficient clearance between the wear plates and guides to permit a slight amount of lateral and fore and aft motion of the journal box unit relative to the truck frame.

The transoms are provided adjacent their ends with upstanding ears 40 between which are pivotally mounted links 42, the lower ends being pivotally connected as at 44 to spring plank 46. The spring plank supports the lower portion of a nest of elliptic springs 48, the upper portion bearing upon and supporting the ends of the bolster D previously referred to. This bolster, as stated, is of substantially conventional design having center bearing 50, side bearings 52 and wear pads 54 adapted to engage wear pads 56 formed on or secured to the inner surfaces of the transoms 6.

Clasp brakes are provided for the truck with the inner and outer shoes 58 and 60, respectively, on each pair of wheel and axle assemblies located and suspended in substantially the conventional position and manner. The inner or adjacent shoes 62 of each pair of wheel and axle assemblies are vertically staggered as clearly shown in Figure 1 in order that the spacing between the pairs of axles may be as close as possible, thus permitting a decreased overall length of truck. In an actual layout it has been shown that by staggering the adjacent brake shoes and by elimination of the customary bolster between the end axles it has been possible to restrict the overall dimension of the eight-wheel truck to the dimensions of the conventional six-wheel truck.

Any load imposed upon the bolster center bearing 50 will be transmitted by the bolster to the nests of elliptic springs and through them and the hangers to the truck frames from which the load will be transmitted through the coil springs to the twin journal boxes intermediate the wheel and axle assemblies upon which they are supported. Due to the fact that the load is transmitted by the coil springs to the twin journal box intermediate the axles, it is obvious that this twin journal box will of itself act as an equalizer to distribute the loads as evenly as possible to the axles upon which the twin journal box is mounted. It is obvious that due to the clearances between the guides of the twin journal box pedestal jaws a certain amount of lateral motion is transmitted as well as a small amount of radial motion, thus insuring greater ease and safety in the negotiation of curves.

While the invention has been described more or less in detail, it is obvious that various modifications and rearrangements of parts may be accomplished without departing from the scope of the invention as defined by the following claims.

What is claimed is:

1. In an eight wheel railway truck the combination of a pair of wheel and axle assemblies adjacent each end of the truck, journal box units joining the adjacent axles together to form each pair, truck side frames, spaced pedestal jaws secured to the side frames and embracing the journal box units for joining the pairs together, means resting on said journal box units for transferring load thereto from said side frames, and bolster means carried by the side frames for transferring load thereto.

2. In an eight wheel railway truck the combination of a pair of wheel and axle assemblies adjacent each end of the truck, journal box units joining the adjacent axles together to form each pair, truck side frames, spaced pairs of pedestal jaws secured to each side frame and embracing the journal box units and joining the units together, resilient means supporting the truck frames upon the journal box units, and bolster means carried by the side frames for transferring load thereto.

3. In an eight wheel railway truck the combination of a pair of wheel and axle assemblies adjacent each end of the truck, journal box units joining the adjacent axles together to form each pair, spaced truck side frames, transoms joining the side frames, spaced pedestal jaws secured to the side frames and embracing the journal box units for joining the pairs together, means resting on said journal box units for transferring load thereto from said side frames, and bolster means swingably carried by the transoms for transferring load to the side frames.

4. In an eight wheel railway truck the combination of a pair of wheel and axle assemblies adjacent each end of the truck, journal box units joining the adjacent axles together to form each pair, truck side frames, transoms joining the side frames, spaced pedestal jaws secured to the side frames and embracing the journal box units and joining the units together, resilient means supporting the truck frames upon the journal box units, a spring plank swingably carried by the transoms, and a bolster resiliently supported upon the spring plank.

5. In an eight wheel railway truck the combination of a pair of wheel and axle assemblies adjacent each end of the truck, journal box units joining the adjacent axles together to form each pair, truck side frames, spaced pairs of pedestal jaws secured to each side frame and embracing the journal box units and joining the units together, resilient means supporting the truck frames upon the journal box units, and bolster means resiliently carried by the side frames for transferring load thereto.

6. In an eight wheel railway truck the combination of a pair of wheel and axle assemblies adjacent each end of the truck, a plurality of pairs of journal boxes rigidly joined together to form a plurality of units connecting the adjacent axles together and forming each pair of wheel and axle assemblies, truck side frames, spaced pairs of pedestal jaws secured to each side frame and embracing the units and joining the units together, resilient means supporting the side frames upon the units, and bolster means resiliently supported upon the side frames for transferring load thereto.

7. In an eight wheel railway truck the combination of a pair of wheel and axle assemblies adjacent each end of the truck, journal box units joining the adjacent axles together to form each pair, truck side frames, spaced pedestal jaws secured to the side frames and embracing the journal box units for joining the pairs together, resilient means located substantially centrally between the axles of each pair of wheel and axle assemblies, said resilient means supporting the truck frames upon the journal box units, and means for transferring load to the side frames.

8. In an eight wheel railway truck the combination of a pair of wheel and axle assemblies adjacent each end of the truck, journal box units joining the adjacent axles together to form each pair, truck side frames, spaced pedestal jaws secured to the side frames and embracing the journal box units for joining the pairs together, resilient means located between the axles of each pair of wheel and axle assemblies for supporting the truck frames upon the journal box units, said resilient means permitting rocking of the units relative to the side frames, and means for transferring load to the said frames.

9. In an eight wheel railway truck the combination of a pair of wheel and axle assemblies adjacent each end of the truck, journal box units joining the adjacent axles together to form each pair, truck side frames, spaced pedestal jaws secured to the side frames and embracing the journal box units for joining the pairs together, resilient means engaging said journal box units and said side frames for the transfer of load therebetween, means carried by the side frames for transferring load thereto and brake shoes engageable with the wheels, certain of said brake shoes being located between the wheels of each pair and being vertically staggered whereby the wheels may be positioned closely adjacent each other to decrease the overall length of the truck.

10. In an eight wheel railway truck the combination of a pair of wheel and axle assemblies adjacent each end of the truck, journal box units joining the adjacent axles together to form each pair, truck side frames, spaced pairs of pedestal jaws secured to each side frame and embracing the journal box units for joining the pairs together, resilient means engaging said journal box units and said side frames for the transfer of load therebetween, means carried by the side frames for transferring load thereto, and brake shoes located between and engageable with the wheels of each pair, said shoes being vertically staggered whereby the wheels may be positioned closely adjacent each other to decrease the overall length of the truck.

11. In an eight wheel railway truck the combination of a pair of wheel and axle assemblies adjacent each end of the truck, journal box units joining the adjacent axles together to form each pair, the wheels of each pair being located closely adjacent each other whereby the lengths of the journal box units and overall dimension of the truck may be reduced, truck side frames each having spaced pairs of pedestal jaws embracing the journal box units for joining the pairs together, resilient means engaging said journal box units and said side frames for the transfer of load therebetween, and means carried by the side frames for transferring loads thereto.

12. In an eight wheel railway truck the combination of a pair of wheel and axle assemblies adjacent each end of the truck, journal box units connecting the adjacent axles together to form each pair, the wheels of each pair being located closely adjacent each other whereby the lengths of the journal box units and overall dimension of the truck may be reduced, truck side frames having spaced pedestal jaws embracing the journal box units for joining the pairs together, resilient means supporting the side frames upon the journal box units between the axles of each pair, and means resiliently carried by the side frames for transferring loads thereto.

13. As an article of manufacture for railway trucks, a twin journal box unit comprising spaced journal boxes having the adjacent sides integrally joined together, pedestal guide portions integrally formed on the opposite sides of the journal boxes, and spring seats formed on the unit intermediate the journal boxes.

14. As an article of manufacture for railway trucks, a twin journal box unit comprising spaced journal boxes having the adjacent sides integrally joined together by an upwardly opening channel member, pedestal guide portions formed on the opposite sides of the journal boxes, and spring seats integrally formed within the channel member intermediate the journal boxes.

15. In an eight wheel railway truck the combination of a pair of wheel and axle assemblies adjacent each end of the truck, journal box units joining the adjacent axles together to form each pair, the wheels of each pair being located closely adjacent each other whereby the lengths of the journal box units and overall dimension of the truck may be reduced, spaced truck side frames, two pairs of spaced pedestal jaws carried by each side frame, each pair of pedestal jaws embracing a journal box unit thereby joining said units together, resilient means supporting the side frames upon the journal box units, and means carried by the side frames for transferring loads to the side frames.

16. In an eight wheel railway truck the combination of a pair of wheel and axle assemblies adjacent each end of the truck, journal box units joining the adjacent axles together to form each pair, spaced truck side frames, two pairs of spaced pedestal jaws secured to each side frame, each pair of pedestal jaws embracing a journal box unit thereby joining said units together, resilient means supporting the side frames upon the journal box units, bolster means carried by the side frames for transferring load to the frames, and brake shoes located between and engageable with the wheels of each pair, said shoes being vertically staggered whereby the wheels of each pair may be positioned closely adjacent each other to decrease the overall length of the truck.

17. In an eight wheel railway truck the combination of a pair of wheel and axle assemblies adjacent each end of the truck, journal box units joining the adjacent axles together to form each pair, the wheels of each pair being located closely adjacent each other whereby the lengths of the journal box units and overall dimension of the truck may be reduced, spaced truck side frames, two pairs of spaced pedestal jaws carried by each side frame, each pair of pedestal jaws embracing a journal box unit thereby joining said units together, resilient means supporting the side frames upon the journal box units, means carried by the side frames for transferring loads to the side frames, and brake shoes located between and engagable with the wheels of each pair, said shoes being vertically staggered whereby they may overlap each other in a vertical plane and the wheels may be positioned closely adjacent each other thereby permitting the reduction in overall dimensions of the truck.

ELMER LATSHAW.